UNITED STATES PATENT OFFICE.

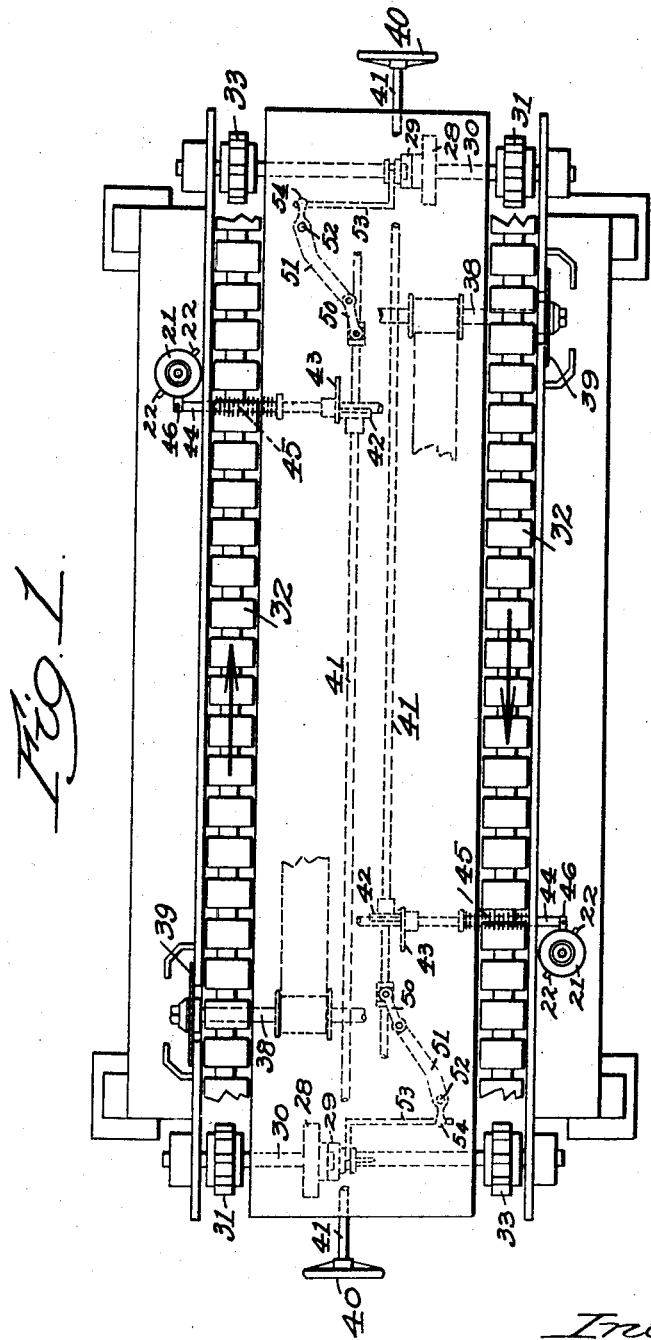

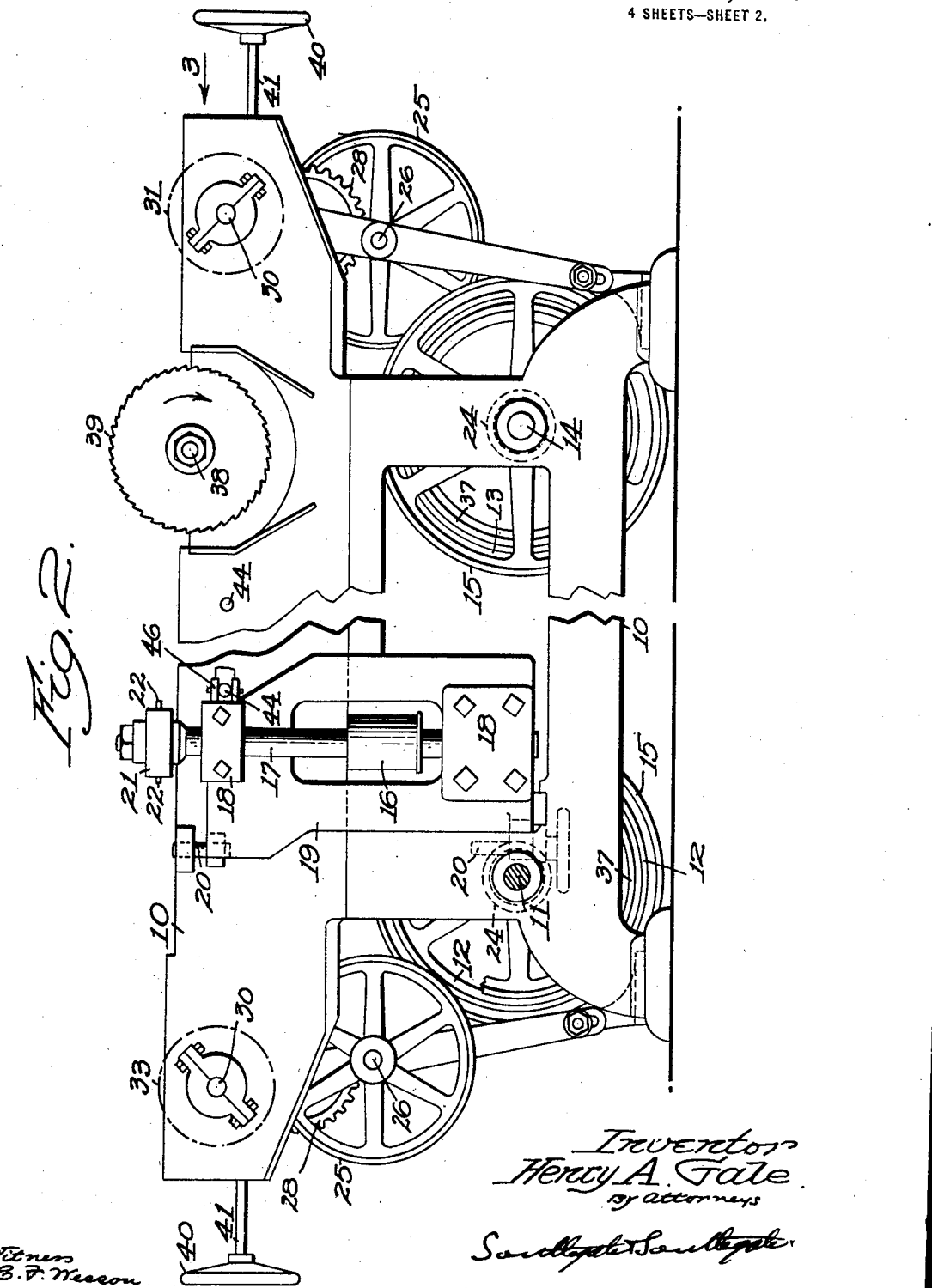

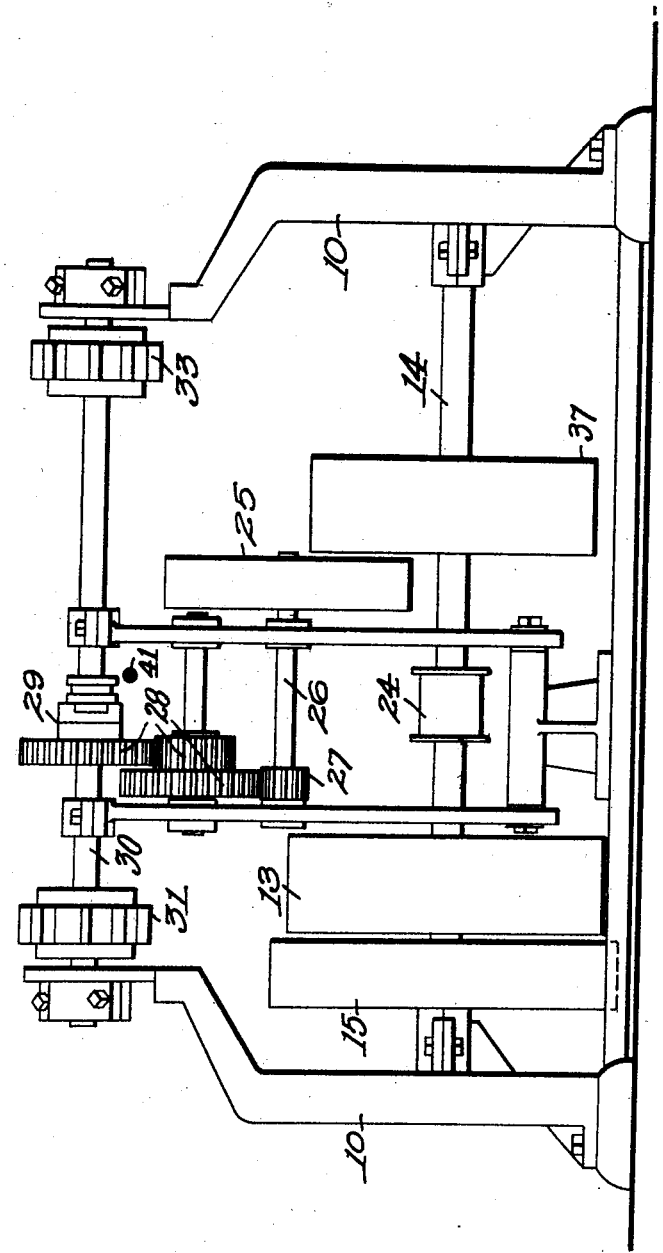

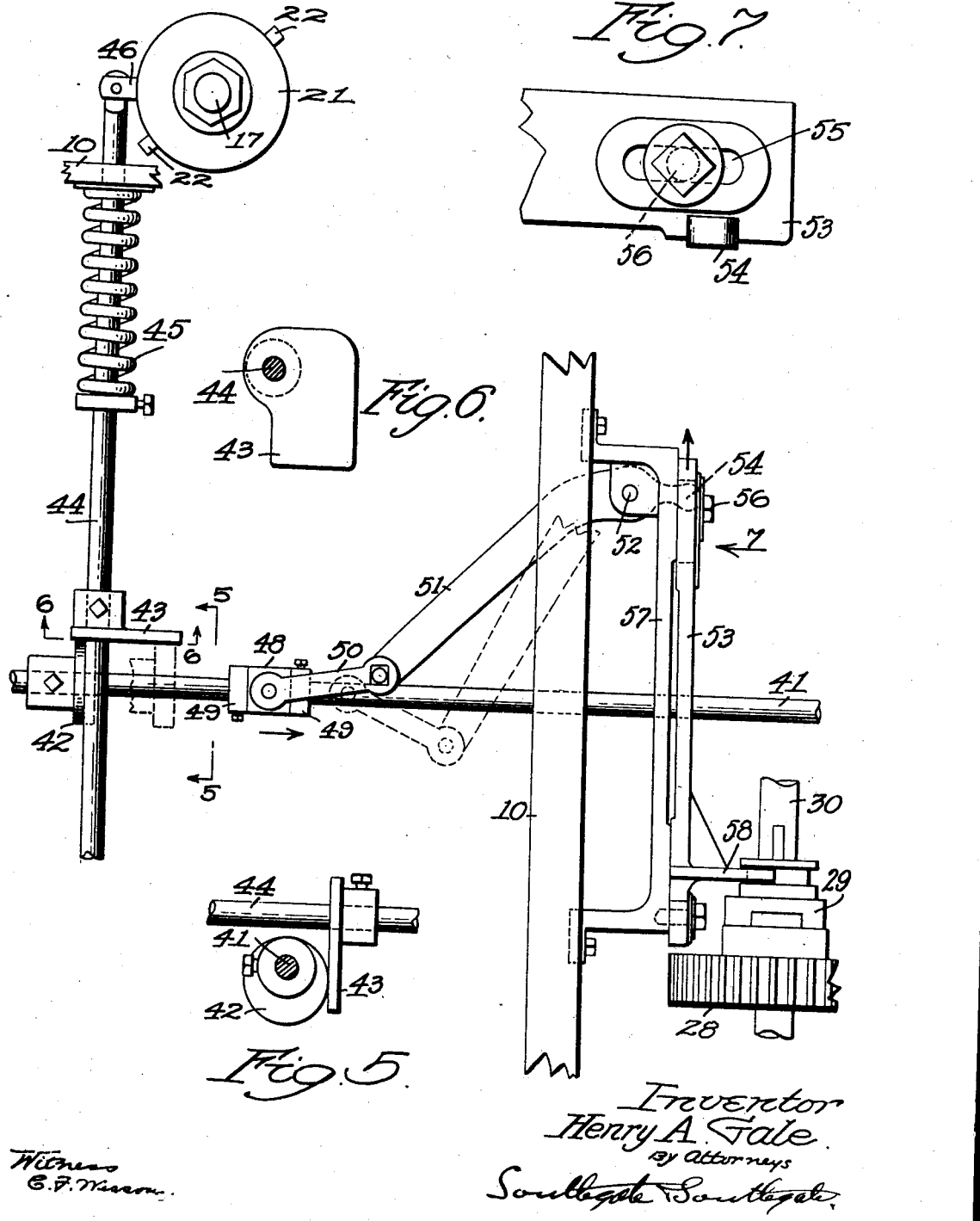

HENRY A. GALE, OF FITCHBURG, MASSACHUSETTS, ASSIGNOR TO GALE BOX MACHINERY COMPANY, OF WEST FITCHBURG, MASSACHUSETTS, A CORPORATION OF MASSACHUSETTS.

LUMBER EDGING AND MATCHING MACHINE.

1,395,408.  Specification of Letters Patent.  Patented Nov. 1, 1921.

Application filed May 17, 1921. Serial No. 470,246.

*To all whom it may concern:*

Be it known that I, HENRY A. GALE, a citizen of the United States, residing at Fitchburg, in the county of Worcester and State of Massachusetts, have invented a new and useful Lumber Edging and Matching Machine, of which the following is a specification.

This invention relates to a machine for edging and matching lumber, especially for making boxes, and constitutes an improvement over my Patent No. 698,111 issued April 22, 1902.

The principal objects of this invention are to provide a convenient means by which the feed of the lumber through each half of the machine can be cut off from the feeding-in end; to provide this in coöperation with means whereby the matcher head is thrown out of position for grooving the edge of the lumber; to provide these features in such relation to each other that only one device need be used on each side of the machine for operating it; to provide the two devices in such relation that they cannot interfere with each other; and to provide the same in combination with other elements for increasing the efficiency of the machine.

Further objects and advantages of the invention will appear hereinafter.

Reference is to be had to the accompanying drawings in which—

Figure 1 is a plan of a matching and edging machine constructed in accordance with this invention;

Fig. 2 is a side view of the same.

Fig. 3 is an end view;

Fig. 4 is a plan on an enlarged scale of the clutch operating mechanism;

Fig. 5 is a sectional view on the line 5—5 of Fig. 4;

Fig. 6 is a sectional view on the line 6—6 of Fig. 4; and

Fig. 7 is an end view of certain parts shown in Fig. 4.

The invention is shown as applied to a machine of the same general type as that illustrated in my above mentioned patent and comprising a frame 10 made in any desired way. On this frame there is a cross shaft 11 which is the main power shaft and which may receive power from a motor on this shaft or from pulleys driven from a countershaft or any other convenient way. On this shaft there is a transmission pulley 12 which transmits power by means of a belt to a transmission pulley 13 on a second shaft 14. The two shafts 11 and 14 have substantially the same functions. Each one is designed to drive certain elements on this machine which is a double one. By a double machine I mean that the boards are fed in at one corner and, as in the above mentioned patent, are fed along the machine on one side and edge and matched on that edge during the operation. They are then taken out of the machine at the other end and put back at that end but on the other side and driven back to the feeding-in end of the machine on the other side. During this travel they are edged and matched on the other edge so the boards are withdrawn from the machine at the feed end. This involves corresponding sets of operating cutters or saws on the two sides of the machine and each one of these shafts 11 and 14 is connected to operate the same elements on one side of the machine that the other shaft operates on the other side.

On each of the shafts 11 and 14 there is a matcher pulley 15 which, by a quarter turn belt, drives the pulley 16 on a vertical shaft 17. This shaft 17 is mounted in bearings 18 on a plate 19 that is pivoted on two vertical rods 20 carried by the frame 10. On the shaft 17 there is a matcher head 21 having cutting blades 22 for cutting the grooves or tongues as the edges of the boards pass through. It is to be remembered that this plate 19 is capable of swinging on its pivots 20 and the means for operating the same will appear later.

Also on the shafts 11 and 14 there are feed pulleys 24. Each feed pulley by a belt drives a feed drive pulley 25 on a shaft 26 at the other end of the machine. This shaft 26 is provided with a gear 27 which through gearing 28 drives a clutch 29. When this clutch is in operative position it drives a cross shaft 30 on which is a sprocket wheel 31 or any other convenient form of wheel for driving an endless chain 32. The other end of this chain is carried by an idler sprocket or other wheel 33 loose on the other shaft 30 at the other end which corresponds with the shaft 30 just described, except that the tight wheel is on the opposite end. The shafts 30 are driven positively from the shafts 11 and 14 through the second shaft and pulley 25 and 26 on the other side.

Also on the shafts 11 and 14 there are saw pulleys 37. Each of these also has a belt which extends the length of the machine and drives the saw shaft 38 having on it a saw 39. The two saws 39 are driven from the two shafts 11 and 14 respectively. It will be understood that the shaft 11 is provided with pulleys corresponding with the three pulleys 15, 24 and 37 and each of these pulleys operates an element on one side of the machine corresponding exactly with the element on the other side operated by the pulleys on the shaft 14, the connections of which have been described in full.

At each end of the machine there is a hand wheel 40. This is mounted on a controlling rod 41 which is capable of reciprocating longitudinally and also of oscillating on its axis. The oscillation of this shaft by the turning of its hand wheel causes an eccentric 42 upon the shaft to push back a plate 43 against which it bears. This plate is fixed on a rod 44 pressed by a spring 45 operating against the frame 10. This eccentric therefore pushes back the rod 44 against the resistance of the spring 45 and, by means of an arm 46, swings the head 21 with the plate 19 back about the pivots 20 into inoperative position.

On the other hand, the reciprocation of this shaft 41 longitudinally carries with it a loose relatively rotatable collar 48, held longitudinally by two tight collars 49. This operates a link 50 and lever 51 from the position shown in full lines in Fig. 4 to the position shown in dotted lines. This swings the lever on its pivot 52. The projecting end 54 of the lever 51 enters a slot in a shifter slide 53. This slide 53 has another slot 55 which guides it to move along a bolt 56 on a bracket 57 in the direction of the arrow in Fig. 4. The shifter slide 53 has a projecting end or claw 58 for directly engaging the clutch 29 and throwing it out to disconnect the power from the shaft 30 on the opposite end of the machine and thus stop the feed of the boards from the point at which that hand wheel 40 is operated. The hand wheel located at the right of the man who feeds the boards in on that side is the one which controls the feed of those boards as well as the matcher head therefor. It will be seen that owing to the fact that the collar 48 is rotatably mounted on the rod 41 and the plate 43 is wide enough to stay in contact with the cam 42 in all its positions, neither device can conflict with the other.

The operation is very simple. In ordinary practice the machine operates continuously with the two carriers running in the directions indicated by the arrows in Fig. 1. An operator at the left of the handle 40 on the feeding-in end of the machine, at the right in Fig. 1, passes the boards into the machine so as to be fed along by the carrier on that side. The saw 39 on that side, operating continuously, trims off the boards to the desired width and then the boards pass by the matcher head which shapes the edges in the desired way. A man stands at the other end of the machine and takes each board out at that end and, without turning it, puts it back on the other side of the machine. They are fed positively along the other side by the other carrier. The same operations are performed on the opposite edge of the board during its course in this way and it is taken out of the machine at the first end by a third attendant. The man who starts the boards in is supposed to control his hand wheel 40. If he desires to stop the feed he pushes in on it and stops the carrier and if it is desired to move the matcher head out of the way he turns it. He has no control over the boards coming toward him but only on those going from him.

It will be seen that the man who places a board in the machine has full control of it as long as it is moving in the same direction and by the manipulation of only a single hand wheel he can control it in two different ways. In that way a single construction is provided which in operation is simple owing to the fact that it has only one element to operate it.

Although I have described and illustrated only a single form of the invention I am aware of the fact that modifications can be made therein by any person skilled in the art within the spirit and scope of my invention as expressed in the claims. Therefore, I do not wish to be limited to all the details herein disclosed but what I do claim is:—

1. In a machine for edging and matching lumber, the combination with a carrier for the lumber, means for operating the carrier, a matcher head movable bodily into and out of operative position, a controlling rod having connections for moving the matcher head, and means connected to the rod for operation thereby for disconnecting the carrier from its operating means.

2. In a machine for edging and matching lumber, the combination with a carrier for the lumber, means for operating the carrier, a matcher head movable bodily into and out of operative position, a controlling rod, means whereby the head can be thrown out of operation by turning the rod, and means whereby the carrier can be disconnected from its operating means by the longitudinal motion of the rod.

3. In a machine for edging and matching lumber, the combination with a laterally movable edging cutter, and an oscillatable controlling rod having connections for throwing the cutter into or out of operative position by the oscillation of said rod, of a work carrier, a clutch for connecting the carrier with a source of power, and means for throwing the clutch out and in by the longitudinal reciprocation of said rod.

4. In a machine for edging and matching lumber, the combination with a movable edging cutter, and a controlling rod having connections for throwing the cutter into or out of operative position, of a work carrier, a clutch for connecting the carrier with a source of power, and means for throwing the clutch out and in by said rod, said cutter throwing connections and clutch throwing means being connected to the rod so that both cannot be operated by a single movement of the rod.

5. In a machine for edging and matching lumber, the combination with two parallel endless carriers for feeding the lumber and means for driving them in opposite directions, of a separate clutch for connecting each of the carriers with the driving mechanism, a controlling rod at each end of the machine for operating one of the clutches, and means whereby the longitudinal reciprocation of either rod will throw out the clutch for driving the carrier that moves to feed the lumber from that end of the machine.

6. In a machine for edging and matching lumber, the combination with two parallel endless carriers for feeding the lumber and means for driving them in opposite directions, of a separate clutch for connecting each of the carriers with the driving mechanism, a controlling hand wheel near the center of each end of the machine, and means whereby the feed on one side of each wheel can be stopped by moving the wheel inwardly in an axial direction.

7. In a machine for operating on the edges of lumber, the combination of a traveling carrier for moving the lumber along the machine, a clutch for connecting the carrier with a source of power, a controlling rod having an operating wheel thereon located at the end of the machine, a lever connected with said rod to be swung on its pivot when the rod is reciprocated, means whereby said rod can be oscillated without operating or binding the lever, a clutch shifter slide connected with the lever to be operated thereby, and means for operating the clutch by the slide.

8. In a machine for operating on the edges of lumber, the combination of a traveling carrier for moving the lumber along the machine, a clutch for connecting the carrier with a source of power, a controlling rod, a lever connected with said rod to be swung on its pivot when the rod is reciprocated, a slide connected with the lever to be operated thereby, and means for operating the clutch by the slide.

In testimony whereof I have hereunto affixed my signature.

HENRY A. GALE.